(12) United States Patent
Duthou et al.

(10) Patent No.: US 7,784,006 B1
(45) Date of Patent: Aug. 24, 2010

(54) METHOD AND APPARATUS FOR DIRECTED PHYSICAL IMPLEMENTATION OF A CIRCUIT DESIGN FOR AN INTEGRATED CIRCUIT

(75) Inventors: Arnaud Duthou, Montbonnot St. Martin (FR); Sridhar Krishnamurthy, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 851 days.

(21) Appl. No.: 11/494,642

(22) Filed: Jul. 27, 2006

(51) Int. Cl.
*G06F 17/50* (2006.01)

(52) U.S. Cl. .................. 716/11; 716/2; 716/6; 716/16; 716/17; 716/18

(58) Field of Classification Search .............. 716/2, 716/6, 16–18, 11
See application file for complete search history.

(56) References Cited

U.S. PATENT DOCUMENTS

| | | | |
|---|---|---|---|
| 5,521,837 A * | 5/1996 | Frankle et al. ............... 716/10 |
| 5,623,420 A | 4/1997 | Yee et al. |
| 5,875,112 A | 2/1999 | Lee |
| 6,453,454 B1 | 9/2002 | Lee et al. |
| 6,490,717 B1 | 12/2002 | Pedersen et al. |
| 7,111,269 B2 | 9/2006 | Satapathy et al. |
| 7,124,391 B1 * | 10/2006 | Patterson ................... 716/17 |
| 7,194,722 B1 * | 3/2007 | Abid et al. .................. 716/16 |
| 7,224,184 B1 * | 5/2007 | Levi et al. ................... 326/41 |
| 7,254,801 B1 | 8/2007 | Borer et al. |
| 7,257,800 B1 | 8/2007 | Singh et al. |
| 7,277,902 B2 * | 10/2007 | Park et al. ................... 707/203 |
| 7,337,100 B1 * | 2/2008 | Hutton et al. ................ 703/13 |
| 7,380,232 B1 * | 5/2008 | Schumacher et al. .......... 716/18 |
| 7,415,682 B2 * | 8/2008 | Padalia et al. ................ 716/2 |
| 7,478,357 B1 * | 1/2009 | Mason et al. ................. 716/16 |
| 7,634,743 B1 | 12/2009 | Ginetti |
| 2002/0023252 A1 | 2/2002 | Lee et al. |
| 2006/0236293 A1 * | 10/2006 | Park et al. ................... 716/17 |
| 2007/0226667 A1 * | 9/2007 | Chadwick et al. ............ 716/6 |

OTHER PUBLICATIONS

U.S. Appl. No. 11/818,012, filed Jun. 13, 2007, Duthou.

* cited by examiner

*Primary Examiner*—Paul Dinh
*Assistant Examiner*—Patrick Sandoval
(74) *Attorney, Agent, or Firm*—Robert M. Brush; LeRoy D. Maunu

(57) ABSTRACT

Method and apparatus for implementing a circuit design for an integrated circuit is described. In one example, matching elements between a modified version of the circuit design and an implemented version of the circuit design are identified. Recommended placements for the matching elements are established based on placement information from the implemented version of the circuit design. An initial placement of the modified version of the circuit design is generated using the recommended placements. Timing-critical elements in the initial placement are identified. Locked placements for elements other than the timing-critical elements are established. An optimized placement of the modified version of the circuit design is generated using the locked placements.

13 Claims, 4 Drawing Sheets

US 7,784,006 B1

METHOD AND APPARATUS FOR DIRECTED PHYSICAL IMPLEMENTATION OF A CIRCUIT DESIGN FOR AN INTEGRATED CIRCUIT

FIELD OF THE INVENTION

One or more aspects of the present invention relate generally to computer aided design of electronic circuits and, more particularly, to a method and apparatus for directed physical implementation of a circuit design for an integrated circuit.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. An FPGA may also include various dedicated logic circuits, such as memories, digital clock managers (DCMs), and input/output (I/O) transceivers. Notably, an FPGA may include one or more embedded processors. The programmable logic of an FPGA (e.g., CLBs, IOBs, and interconnect structure) is typically programmed by loading a stream of configuration data (known as a bitstream) into internal configuration memory cells. The states of the configuration memory cells define how the CLBs, IOBs, interconnect structure, and other programmable logic are configured. Some FPGAs include support for run-time partial reconfiguration, which provides the ability to alter the behavior of portions of a circuit configured in an active FPGA. Partial reconfiguration is useful in systems that must support a wide range of optional behavior, only a subset of which is operational at any point in time.

To implement a circuit design using an FPGA, the design is synthesized and mapped onto programmable logic blocks, placed within the FPGA, and routed using the programmable fabric. The place and route phases of implementing a circuit design involve generating a layout of the circuit elements on the FPGA and defining the signal lines (routing resources) that connect the elements. It is often necessary to modify a design after the design is physically implemented. The current techniques to implement small changes to a design are inefficient both in terms of CPU runtime and in the quality of the results. For example, after making a change to a design, a designer may completely re-implement the design from scratch. Such a technique, however, is not runtime efficient. Alternatively, a designer may employ strict guiding methods that may improve runtime, but often provides results of poor quality. Accordingly, there exists a need in the art for an improved method and apparatus for implementing a modified version of a previously implemented circuit design.

SUMMARY OF THE INVENTION

Method and apparatus for implementing a circuit design for an integrated circuit is described. In one embodiment, matching elements between a modified version of the circuit design and an implemented version of the circuit design are identified. Recommended placements for the matching elements are established based on placement information from the implemented version of the circuit design. An initial placement of the modified version of the circuit design is generated using the recommended placements. Timing-critical elements in the initial placement are identified. Locked placements for elements other than the timing-critical elements are established. An optimized placement of the modified version of the circuit design is generated using the locked placements.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for directed physical implementation of a circuit design for an integrated circuit is described. One or more aspects of the invention are described with respect to implementing a circuit design for a field programmable gate array (FPGA). Those skilled in the art will appreciate that the invention may be adapted to implement a circuit design for other types of integrated circuits, such as application specific integrated circuits (ASICs), complex programmable logic devices (CPLDs), and the like.

Figure 1:
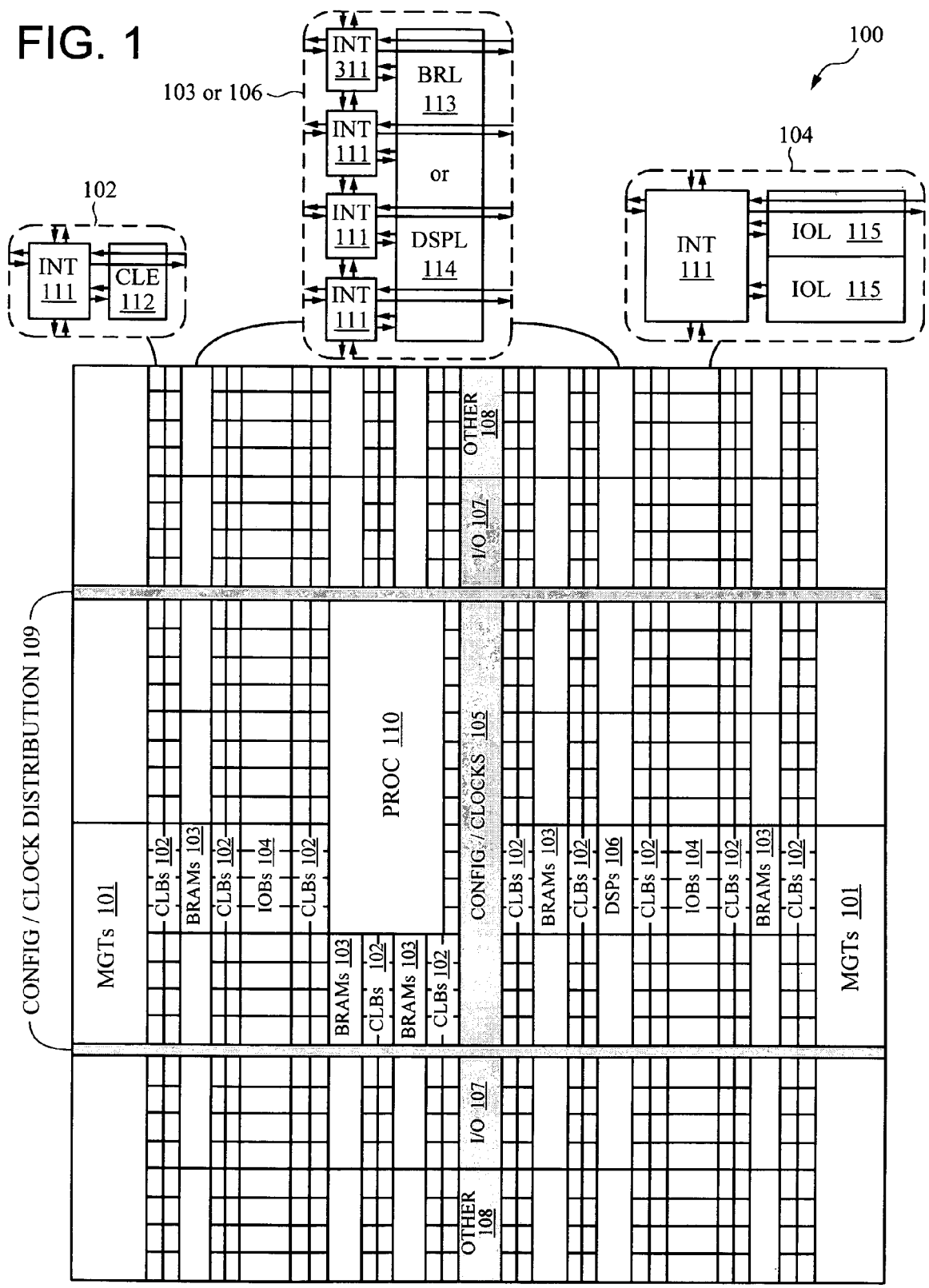
FIG. 1 illustrates an exemplary FPGA architecture.

FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth.

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

The FPGA architecture 100 also includes one or more dedicated processor blocks (PROC 110). The processor block 110 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic (e.g., CLBs, IOBs). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art. The processor block 110 is coupled to the programmable logic of the FPGA in a well known manner.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Configuration information for the programmable logic is stored in configuration memory (not shown). The configuration logic 105 provides an interface to, and loads configuration data to, the configuration memory. A stream of configuration data ("configuration bitstream") may be coupled to the configuration logic 105, which in turn loads the configuration memory. Notably, the configuration logic 105 is configured to support the loading of partial configuration bitstreams while the FPGA is active. This allows for reconfiguration of portions of the FPGA during runtime. The configuration and reconfiguration process for the FPGA is well known in the art.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

The FPGA of FIG. 1 is capable of partial dynamic active reconfiguration while the FPGA is active via a partial reconfiguration process. A design configured in an FPGA may be divided into a static portion and one or more reconfigurable modules. A reconfigurable module is capable of being dynamically reconfigured while the FPGA is active. Once the target FPGA is active, a static portion is fixed and cannot be reconfigured. The partial reconfiguration process is well known in the art.

Figure 2:
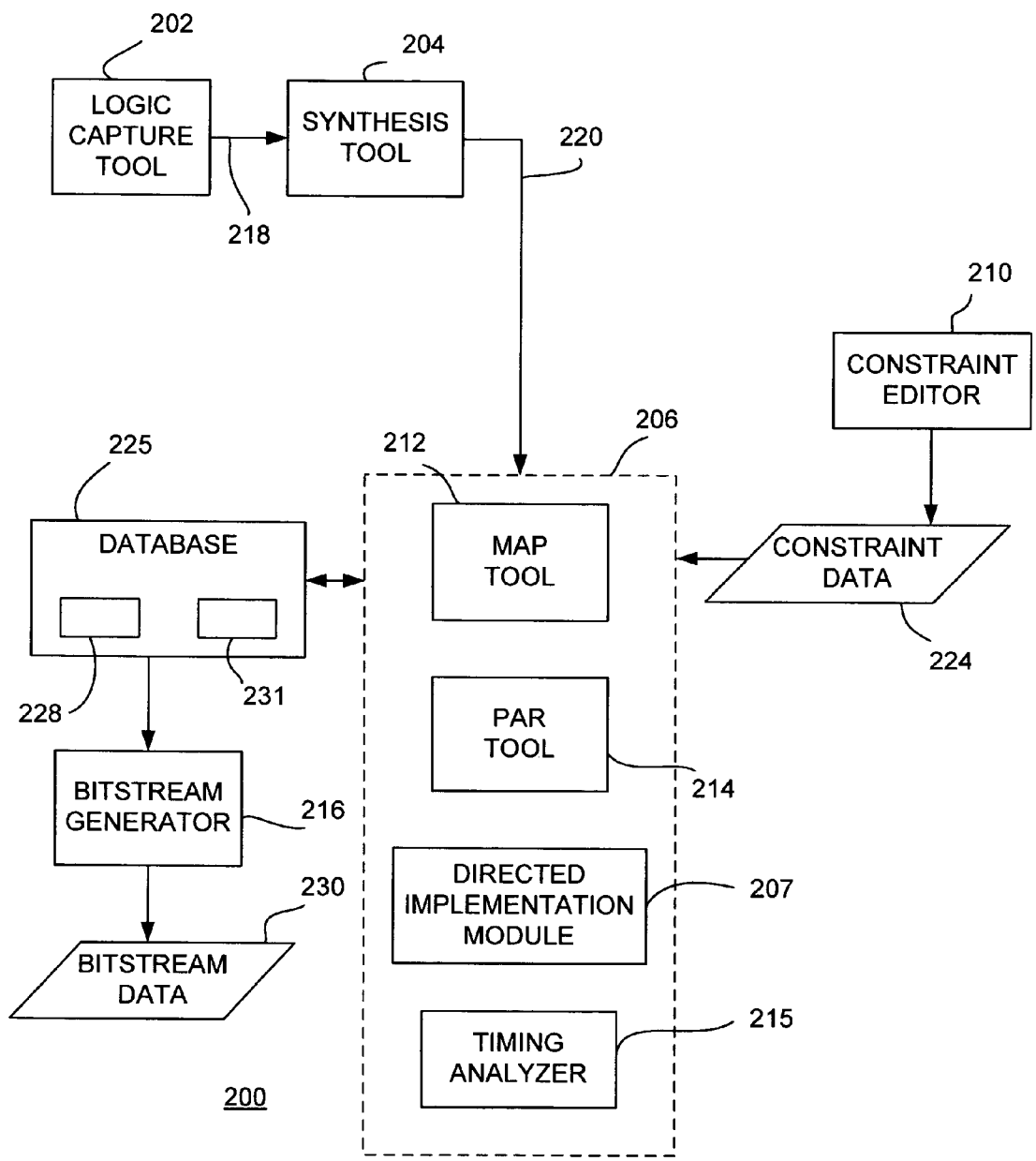
FIG. 2 is a block diagram depicting an exemplary embodiment of a logic design system for a programmable logic device (PLD) in accordance with one or more aspects of the invention.

FIG. 2 is a block diagram depicting an exemplary embodiment of a logic design system 200 for a programmable logic device (PLD) in accordance with one or more aspects of the invention. The system 200 includes a logic capture tool 202, a synthesis tool 204, a constraint editor 210, an implementation tool 206, and a bitstream generator 216. In the present embodiment, the system 200 is configured to implement a logic design using a target FPGA. Accordingly, the implementation tool 206 includes a map tool 212, a place-and-route (PAR) tool 214, and a timing analysis tool 215. The system 200 may be implemented using the computer 400 of FIG. 4 and described below. Notably, the tools may be part of one or more software programs stored in a memory and configured for execution by a Central processing unit (CPU).

One or more aspects of the invention relate to directed physical implementation of a circuit design for an FPGA using a previously implemented version of the design. The system 200 is configured to leverage results of implementation of a previous version of the design to generate a new implementation with an equivalent quality of result with a shorter processing runtime. For purposes of clarity by example, the logic design system 200 is described immediately below with respect to a logic design in general. Features of the design system 200 specifically pertaining to directed physical implementation are described thereafter.

In particular, the logic capture tool 202 is configured to capture a circuit design from a user and generate a behavioral description 218 of the circuit design. The behavioral description 218 includes a plurality of circuit components, such as flip-flops, memories, gates, LUTs, and the like, connected together via signal conductors (nets). The logic capture tool 202 may include a graphic interface through which a designer connects symbols and blocks representing various components to produce a schematic description of the circuit design. The logic capture tool 202 may also include a text interface through which a designer writes hardware description language (HDL) code to produce a structural and/or behavioral description of the circuit design in terms of HDL constructs. Examples of HDLs include the Very high-speed integrated circuit Hardware Description Language (VHDL) and VERILOG.

The synthesis tool 204 is configured to receive the behavioral description 218. The synthesis tool 204 processes the behavioral description 218 to produce a logical description 220 of the circuit design. The logical description 220 includes a logical network list ("netlist") of lower-level circuit elements and logic gates, as well as connections (nets) between inputs and outputs thereof, in terms of the hierarchy specified in the behavioral description 218. For example, the logical description 220 may be compliant with the Electronic Design Interchange Format (EDIF). The synthesis tool 204 may also generate constraint data associated with the logical description 220 that includes various timing and layout constraints. Alternatively, the logical description 220 may be annotated with constraint data. Such an annotated netlist is produced by XST synthesis tool, commercially availably by Xilinx, Inc., of San Jose, Calif.

A designer may use the constraint editor 210 to produce constraint data 224 having various constraints, such as PERIOD constraints (i.e., the time between rising edges of a clock signal) for all clocks, as well as input/output (IO) timing constraints (time between two pins, typically measured from a clock input at a first pin and data out at a second pin) for IOs, placement constraints (e.g., positions and ranges of logic blocks), and the like.

The implementation tool 206 is configured to receive the logical description 220 and the constraint data 224. The map tool 212 maps the logical description 220 onto physical resources within the target FPGA (i.e., the circuit components, logic gates, and signals are mapped onto LUTs, flip-flops, clock buffers, I/O pads, and the like of the target FPGA). The map tool 208 produces a mapped circuit description 226 in accordance with any constraints in the constraint data 224. The mapped circuit description 226 includes groupings of the physical resources of the target FPGA expressed in terms of CLBs and IOBs, and other physical resources on the FPGA.

The PAR tool 214 determines placement for the physical resource groupings of the mapped circuit description 226 in the target FPGA and apportions the appropriate routing resources. The PAR tool 214 performs such placement and routing in accordance with any constraints in the constraint data 224. The PAR tool 214 produces physical design data (e.g., a placed and routed netlist), which is stored in a database 225. The bitstream generator 216 is configured to obtain physical design data from the database 225 and produce bitstream data 230 for the target FPGA.

The timing analysis tool 215 is configured to perform static timing analysis on the design. Timing analysis may be performed after mapping, placing, and routing the design. The timing analysis tool 215 is configured to report delays for particular paths and slack values based on specified timing requirements. Output of the timing analysis tool 215 may be used to identify critical paths in the design.

In one embodiment of the invention, the design system 200 is utilized to generate a first behavioral description of a circuit design and corresponding first physical design data. This first behavioral description is referred to as the "original version" of the circuit design, and the corresponding first physical design data is referred to as the "original" implementation of the circuit design ("original implementation 228"). A second behavioral description is then produced, which represents a modified version of the circuit design (e.g., elements and/or connections in the circuit design may be removed, added, or otherwise modified from the original version). The implementation tool 206 is configured to receive a logical description (e.g., netlist) representing the modified version of the circuit design 231 and to implement the logical description using directed physical implementation based on the original implementation of the circuit design 228. The implementation tool 206 obtains the original implementation from the database 225.

In particular, the implementation tool 206 may include a directed implementation module 207 for initiating and controlling directed physical implementation. Those skilled in the art will appreciate that the functions performed by the directed implementation module 207 describe below may be incorporated into the MAP tool 212 and/or PAR tool 214, rather than in a separate module as shown. The directed implementation module 207 is configured to identify matching circuit elements between the modified version and the original version of the circuit design. For example, a netlist for the modified version (generated by the synthesis tool 204) may be compared with the implemented netlist for the original version. An element having the same "name" (e.g., identifier) in both netlists may be deemed as being matching elements. The directed implementation module 207 obtains placement information for the matching elements from the original implementation 228, and applies a "weak lock" to each of the matching elements. A "weak lock" means that an initial recommended placement for the element is provided, but such a recommended placement may be changed if the PAR tool 214 finds a more suitable location.

The PAR tool 214 generates an initial placement for the modified version of the design. The matching elements are placed in accordance with their weak locks, and the new elements are placed without any guiding. Once an initial placement is generated, signal and block delay information may be obtained. Notably, the directed implementation module 207 is configured to perform a timing analysis on the modified version as initially placed to identify timing-critical elements. Given initial placements for all of the elements in the modified version, the delays on connections between the elements may estimated. The criticality of a connection can be measured by the "slack" thereof. Slack is the difference between the time a signal is to arrive at a particular destination to meet established design constraints and the actual time, or estimated time as determined by a design tool, at which the signal arrives. The more negative the slack, the more critical both the connection and the elements associated with that connection.

The directed implementation module 207 determines criticality by comparing the slack values to a threshold slack value. In one embodiment, the threshold slack is zero. If slack of a connection is positive, then the element associated therewith is classified as being non-critical. Otherwise, the element is classified as being critical. The directed implementation module 207 applies a "strong lock" to each element other than the timing-critical elements based on the initial placement. A strong lock on an element indicates that the change of placement cannot be initiated by itself. An element having a strong lock will maintain its position in the final placement, unless its position was swapped by a timing critical element.

Notably, some or all of the elements previously having a weak lock are transformed into strong locked elements. If an element having a weak lock is deemed non-critical, then the weak lock is transformed into a strong lock. Furthermore, some elements having weak locks may receive strong locks regardless of their criticality. For example, if an element having a weak lock represents a clock or an IOB element, then the weak lock may be transformed into a strong lock. Note that some weakly locked elements may not receive a strong lock (e.g., some weakly locked elements may be deemed timing critical).

The PAR tool 214 is then configured to generate an optimized placement of the modified version. The non-critical elements are placed in accordance with their strong locks, and the timing-critical elements are placed in a manner that seeks to minimize critical connections between components. In some cases, the PAR tool 214 may not be able to meet timing constraints given the strong locked elements. In such a case, one or more of the strong locked elements may be "unlocked." That is, strong locks(s) may be removed so that the corresponding element(s) can be moved along with the critical-elements. If timing is met, physical design data is stored in the database 225 for the modified version of the design ("modified implementation data 231").

In another embodiment, the threshold slack may be a negative value such that a small negative slack is deemed non-critical, resulting in a larger number of non-critical elements. This would result in less runtime, as a larger number of elements would be strongly locked. In yet another embodiment, the threshold slack may be a positive value such that a smaller number of elements are deemed to be non-critical. This would improve the quality of the results at the expense of runtime, as strong locks would be used on fewer elements.

Using the combination of weak and strong locks, the implementation tool 206 will be able to optimize the most critical part of the circuit design resulting in a suitable quality of result, while improving runtime. The inventors have found that the invention provides an average 45% gain in runtime and a clock frequency gain of more than 1% (a quality measure) over a non-directed technique (e.g., starting the implementation of the modified version from scratch).

Figure 3:
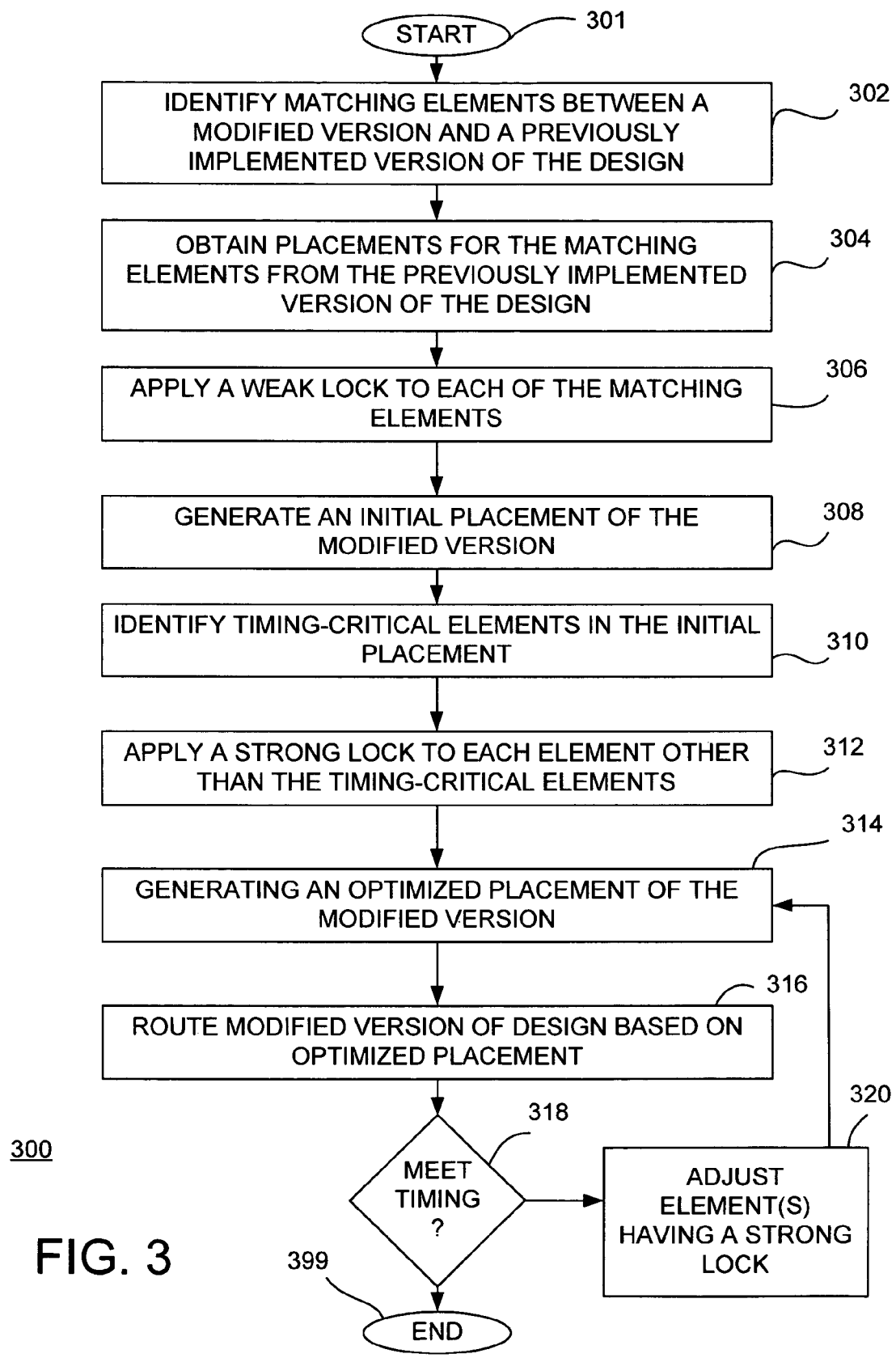
FIG. 3 is a flow diagram depicting an exemplary embodiment of a method for implementing a circuit design for an integrated circuit in accordance with one or more aspects of the invention.

FIG. 3 is a flow diagram depicting an exemplary embodiment of a method 300 for implementing a circuit design for an integrated circuit in accordance with one or more aspects of the invention. The method 300 begins at step 301. At step 302, matching elements between a modified version and a previously implemented version of a circuit design are identified. For example, an implemented netlist for the implemented version and a modified netlist for the modified version may be obtained and compared. Elements that are present in both netlists may be designed are matching elements. At step 304, placements for the matching elements are obtained from the previously implemented version of the design. That is, the matching elements have already received placements during the previously implementation of the design and such placements are used during implementation of the modified version of the design.

At step 306, a weak lock is applied to each of the matching elements. That is, recommended placements are established for the matching elements base on the placement information from the previously implemented version of the design. At step 308, an initial placement is generated for the modified version of the design. For example, elements other than the matching elements are placed with the matching elements using the weak locks associated with the matching elements as recommended placements thereof.

At step 310, timing-critical elements in the initial placement are identified. In one embodiment, slack values of estimated connections for the elements in the initial placement are determined. The slack values are compared to a threshold slack value. Any element having a slack value that does not satisfy the threshold is deemed as being timing-critical. At step 312, a strong lock is applied to each element other than the timing critical elements (i.e., the elements that are not deemed timing critical). In some cases, for the matching elements that are not identified as being timing critical, the weak locks are transformed into strong locks. For the matching elements that are representative of clocks or IOBs, the weak locks are transformed in to strong locks. A strong lock is not applied to any element that is deemed to be timing critical.

At step 314, an optimized placement of the modified version is generated. The placement of the timing-critical elements is optimized while trying to maintain the locations of strongly locked elements. The timing-critical elements are placed in a manner that seeks to minimize critical connections between components. At step 316, the modified version of the circuit design is routed based on the optimized placement. At step 318, a determination is made whether the modified version meets timing constraints. If so, the method 300 ends at step 399. Otherwise, the method 300 proceeds to step 320, where one or more elements having a strong lock are adjusted to remove the strong lock. The method 300 returns to step 314 and repeats until timing is met.

Figure 4:
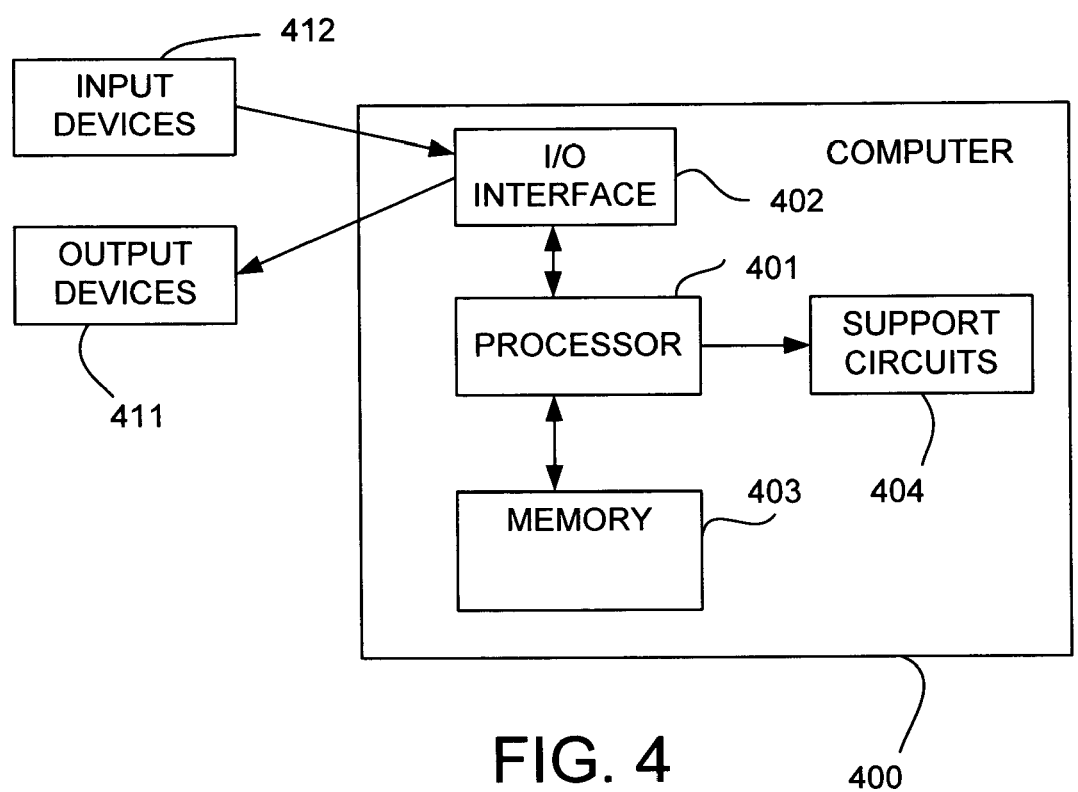
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. For example, the computer 400 may be used to implement the system 200 of FIG. 2, as well as the method 300 of FIG. 3. The computer 400 includes a processor 401, a memory 403, various support circuits 404, and an I/O interface 402. The processor 401 may be any type of microprocessor known in the art. The support circuits 404 for the processor 401 include conventional cache, power supplies, clock circuits, data registers, I/O interfaces, and the like. The I/O interface 402 may be directly coupled to the memory 403 or coupled through the processor 401. The I/O interface 402 may be coupled to various input devices 412 and output devices 411, such as a conventional keyboard, mouse, printer, display, and the like.

The memory 403 stores all or portions of one or more programs and/or data to implement the system 200 and the method 300 described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD) Such computer readable media, when carrying computer-readable instructions that direct functions of the invention, represent embodiments of the invention.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. A method of implementing a circuit design for an integrated circuit, comprising:

identifying matching elements between a modified version of the circuit design and an implemented version of the circuit design, the modified version of the circuit design including at least one of an element or a connection that is different from the implemented version of the circuit design;

identifying a placement in the implemented version of the circuit design for each of the matching elements;

applying a weak lock to each of the matching elements with respect to the identified placement, wherein the weak locks establish recommended placements for the matching elements based on the identified placement;

generating an initial placement of the modified version of the circuit design using the recommended placements;

wherein, while generating the initial placement, placement of the matching elements having the weak lock is subject to change;

identifying timing-critical elements in the initial placement;

transforming the weak lock to a strong lock on the initial placement of each of the matching elements that is not identified as timing-critical; and generating, using a computer, an optimized placement of the modified version of the circuit design from the initial placement having the weak and strong locks;

wherein the generating of the optimized placement includes, in response to the optimized placement not meeting timing constraints and having elements with strong locks on the initial placement, removing the strong lock on the initial placement of at least one of the elements, and generating a new optimized placement while permitting the at least one element to be moved from the initial placement to meet timing constraints.

2. The method of claim 1, wherein the step of identifying comprises:

obtaining an implemented netlist for the implemented version of the circuit design and a modified netlist for the modified version of the circuit design;

comparing the modified netlist with the implemented netlist; and designating elements present in both the modified netlist and the implemented netlist as the matching elements.

3. The method of claim 1, further comprising transforming the weak lock to a strong lock for each of the matching elements representing clock or input/output block (IOB) elements.

4. The method of claim 1, wherein the step of identifying the timing-critical elements comprises:

identifying slack values of estimated connections for the elements in the initial placement;

comparing the slack values to a threshold; and designating as timing-critical each of the elements where the slack value thereof does not satisfy the threshold.

5. Apparatus for implementing a circuit design for an integrated circuit, comprising:

a processor;

a memory coupled to the processor, wherein the memory is configured with a directed implementation module and a place and route module that are executable by the processor;

the directed implementation module for identifying matching elements between a modified version of the circuit design and an implemented version of the circuit design, identifying a placement in the implemented version of the circuit design for each of the matching elements, applying a weak lock to each of the matching elements with respect to the identified placement, wherein the weak locks establish recommended placements for the matching elements based on the identified placement, generating an initial placement of the modified version of the circuit design using the recommended placements with placement of the matching elements having the weak lock subject to change, identifying timing-critical elements in the initial placement of the modified version of the circuit design using the recommended placements, transforming the weak lock to a strong lock on the initial placement of each of the matching elements that is not identified as timing-critical, and where the modified version of the circuit design including at least one of an element or a connection that is different from the implemented version of the circuit design; and the place and route module for generating an optimized placement of the modified version of the circuit design from the initial placement having the weak and strong locks, wherein the generating of the optimized placement includes, in response to the optimized placement not meeting timing constraints and having elements with strong locks on the initial placement, removing the strong lock on the initial placement of at least one of the elements, and generating a new optimized placement while permitting the at least one element to be moved from the initial placement to meet timing constraints.

6. The apparatus of claim 5, wherein the directed implementation module is configured to:

obtain an implemented netlist for the implemented version of the circuit design and a modified netlist for the modified version of the circuit design;

compare the modified netlist with the implemented netlist; and designate elements present in both the modified netlist and the implemented netlist as the matching elements.

7. The apparatus of claim 5, wherein the directed implementation module is further configured to transform the weak lock to a strong lock for each of the matching elements representing clock or input/output block (IOB) elements.

8. The apparatus of claim 5, wherein the directed implementation module is configured to:

identify slack values of estimated connections for the elements in the initial placement;

compare the slack values to a threshold; and designate as timing-critical each of the elements where the slack value thereof does not satisfy the threshold.

9. The apparatus of claim 5, wherein the place and route module is configured to:

optimize placement of the timing-critical elements while maintaining location of elements having the locked placements.

10. A computer readable medium having stored thereon software that when executed by a processor causes the processor to perform a method for implementing a circuit design for an integrated circuit, comprising:

identifying matching elements between a modified version of the circuit design and an implemented version of the circuit design, the modified version of the circuit design including at least one of an element or a connection that is different from the implemented version of the circuit design;

identifying a placement in the implemented version of the circuit design for each of the matching elements;

applying a weak lock to each of the matching elements with respect to the identified placement, wherein the weak locks establish recommended placements for the matching elements based on the identified placement;

generating an initial placement of the modified version of the circuit design using the recommended placements;

wherein, while generating the initial placement, placement of the matching elements having the weak lock is subject to change;

identifying timing-critical elements in the initial placement;

transforming the weak lock to a strong lock on the initial placement of each of the matching elements that is not identified as timing-critical; and generating an optimized placement of the modified version of the circuit design from the initial placement having the weak and strong locks;

wherein the generating of the optimized placement includes, in response to the optimized placement not meeting timing constraints and having elements with strong locks on the initial placement, removing the strong lock on the initial placement of at least one of the elements, and generating a new optimized placement while permitting the at least one element to be moved from the initial placement to meet timing constraints.

11. The computer readable medium of claim 10, wherein the step of identifying comprises:

obtaining an implemented netlist for the implemented version of the circuit design and a modified netlist for the modified version of the circuit design;

comparing the modified netlist with the implemented netlist; and designating elements present in both the modified netlist and the implemented netlist as the matching elements.

12. The computer readable medium of claim 10, wherein the step of establishing the locked placements comprises transforming the weak lock to a strong lock for each of the matching elements representing clock or input/output block (IOB) elements.

13. The computer readable medium of claim 10, wherein the step of identifying the timing-critical elements comprises:

identifying slack values of estimated connections for the elements in the initial placement;

comparing the slack values to a threshold; and designating as timing-critical each of the elements where the slack value thereof does not satisfy the threshold.

* * * * *